United States Patent
Magnuson

(10) Patent No.: US 6,755,474 B2
(45) Date of Patent: Jun. 29, 2004

(54) DOWNWARDLY PIVOTING ARMREST

(75) Inventor: Richard Magnuson, Kentwood, MI (US)

(73) Assignee: American Seating Company, Grand Rapids, MI (US)

( * ) Notice: Subject to any disclaimer, the term of this patent is extended or adjusted under 35 U.S.C. 154(b) by 0 days.

(21) Appl. No.: 10/028,372

(22) Filed: Dec. 28, 2001

(65) Prior Publication Data

US 2002/0109388 A1 Aug. 15, 2002

Related U.S. Application Data

(60) Provisional application No. 60/259,224, filed on Jan. 3, 2001.

(51) Int. Cl.[7] ................................................. A47C 7/54
(52) U.S. Cl. ................................................. 297/411.38
(58) Field of Search .................. 297/411.35, 411.38, 297/411.32, 363–365, 408

(56) References Cited

U.S. PATENT DOCUMENTS

| | | | |
|---|---|---|---|
| 3,397,912 A | * | 8/1968 | Bush ..................... 297/354.12 |
| 3,468,582 A | | 9/1969 | Judd |
| 4,310,196 A | | 1/1982 | Vogel |
| 4,657,305 A | | 4/1987 | Meiller |
| 4,807,935 A | * | 2/1989 | King ..................... 297/411.38 |
| 4,828,323 A | * | 5/1989 | Brodersen et al. ..... 297/411.36 |
| 4,902,072 A | | 2/1990 | Chancellor, Jr. |
| 5,297,839 A | | 3/1994 | Fukushima |
| 5,678,896 A | * | 10/1997 | Chung ..................... 297/411.38 |
| 5,733,010 A | | 3/1998 | Lewis et al. |
| 6,257,668 B1 | * | 7/2001 | Chou et al. ............ 297/411.32 |

* cited by examiner

Primary Examiner—Peter R. Brown
(74) Attorney, Agent, or Firm—Clark & Brody

(57) ABSTRACT

A pivoting armrest is configured for mounting on the bottom part of the aisle side of a vehicle seat frame. The armrest may receive a control cable and is mounted on a hub that allows passage of the control cable to the vehicle seat mechanism. The armrest is maintained in position by a lock pin, and a resilient plate controls the lock pin. A handgrip is mounted to a lower part of the armrest for easy grasping by the fingers of a user. The handgrip engages a lower edge of the resilient plate so that a user's pulling outward on the lower edge of the handgrip releases the lock pin.

8 Claims, 3 Drawing Sheets

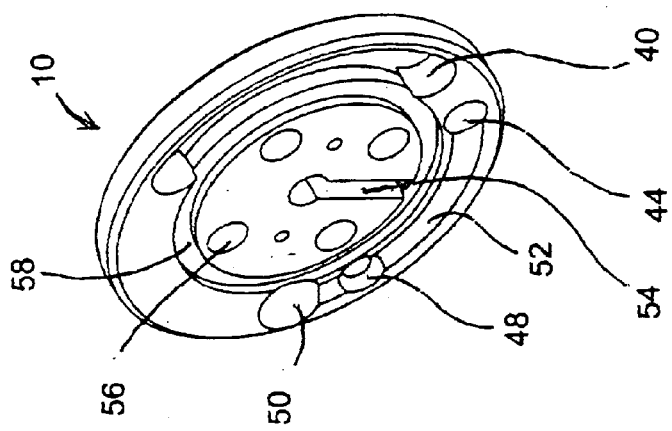
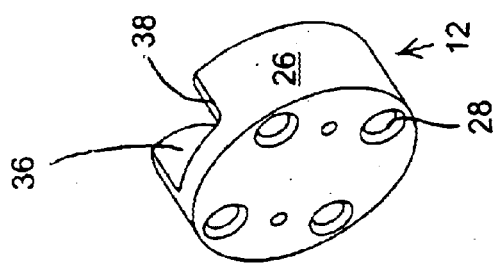
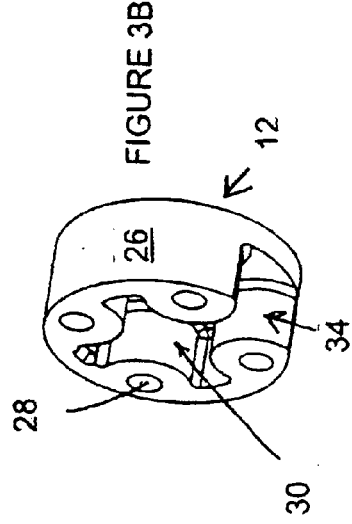
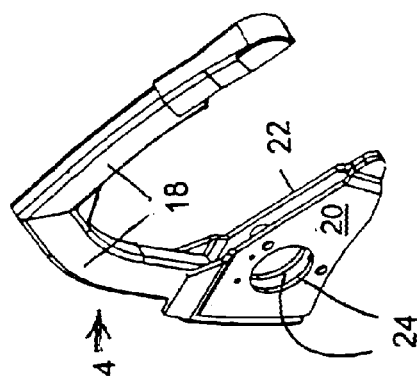

DOWNWARDLY PIVOTING ARMREST

CROSS REFERENCE TO RELATED APPLICATIONS

This application claims the benefit of provisional patent application No. 60/259,224 filed Jan. 3, 2001.

TECHNICAL FIELD

This invention relates to the art of passenger seating for vehicles. In particular, the invention relates to an armrest for use on the aisle side of a mass-transit seat and which pivots downward to allow passengers to enter or leave the seat.

BACKGROUND

Seats used in mass transit vehicles commonly have armrests. When an armrest is located other than adjacent a wall of the vehicle, such as an armrest adjacent an aisle, it must be movable between a use position, where it can be used as an armrest, and a non-use position, in which it allows passengers to enter and exit the seats without obstruction by the armrest.

It is known for aisle armrests to pivot from the use position either upwardly or downwardly. In the typical installation, the armrest is attached pivotally to an upright part of the seat back for upward pivotal movement to the storage position.

SUMMARY OF THE INVENTION

In accordance with the invention, an armrest is pivotally mounted to a seat frame such that it pivots downwardly from the use position to a non-use position to facilitate passengers' entering and leaving the seat. The armrest includes a finger-operated mechanism for a cable that controls one or more known seat mechanisms, for example, a mechanism that controls the orientation of the seat back between upright and reclining positions. The armrest also includes a lock for retaining the armrest in the use position and for allowing it to pivot to the non-use position when released.

In the preferred embodiment, the armrest is mounted for rotation on a hub that is secured to the seat frame. The dimensions of the hub are such that it also accommodates the control cable, which passes through the interior of the armrest, and directs the cable from the interior of the armrest to the seat control mechanism. The hub is preferably cylindrical, and the armrest rides on the outer surface.

BRIEF DESCRIPTION OF THE DRAWINGS

FIG. 2 is a perspective of a metal frame for the armrest shown in FIG. 1.

FIGS. 3A and 3B are enlarged perspective views of a preferred hub element of the mounting mechanism.

FIG. 4 is an enlarged perspective of a preferred index plate of the mounting mechanism.

DETAILED DESCRIPTION OF THE PREFERRED EMBODIMENT

Figure 1:
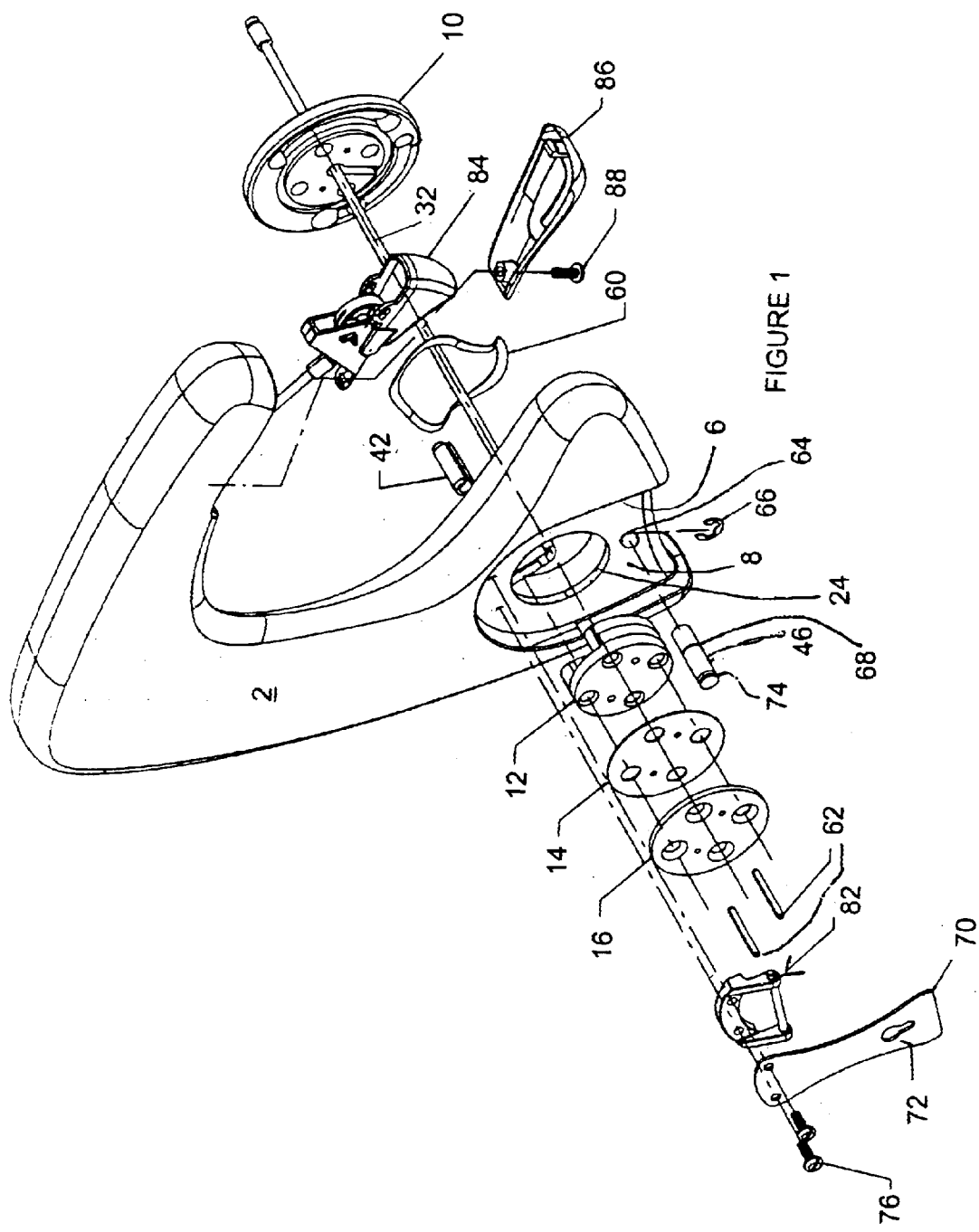
FIG. 1 is an assembly view of a downwardly pivoting armrest and mounting mechanism in accordance with the invention.
Figure 6:
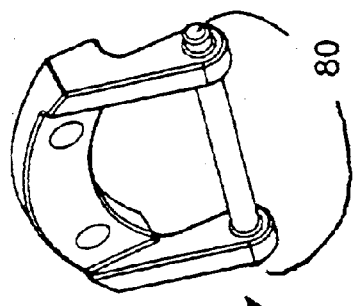
FIG. 6 is an enlarged perspective view of a handgrip mount.

With reference to FIG. 1, an armrest 2 for use primarily with seating for mass transit vehicles is pivotally mounted to a seat frame (not illustrated). The armrest is designed to pivot downward to a non-use position and includes a hub mechanism for securing the armrest to the frame while allowing it to pivot between use and non-use positions.

The armrest is preferably constructed of a metal frame as shown in FIG. 2 and a decorative cover over the frame as illustrated in FIG. 1. With reference to FIG. 1, the decorative cover includes a recess 6 that exposes a portion 8 of the frame for receiving the mounting mechanism.

The mounting mechanism includes, primarily, an index plate 10, a hub 12, a washer 14 and an end plate 16. It will be appreciated from FIG. 2 that the frame 4 comprises a hollow channel section 18 and two, spaced hub plates 20 and 22. Each of the hub plates includes a circular opening 24, and the openings are aligned to receive the hub 12. The inner diameters of the openings 24 are essentially that of the outer diameter of the hub 12 whereby the armrest 2 pivots about the hub 12.

With reference to FIGS. 3A and 3B, the hub 12 includes a cylindrical outer wall 26 that engages the inner walls forming the openings 24 to support the armrest. The hub also includes boltholes 28 and a cavity 30. The cavity 30 receives the cable 32, which passes from the tip of the armrest, through the hollow frame, through the mounting mechanism, and then to a seat control element, which has not been illustrated. The entrance to 34 to the hub cavity is flute-shaped and includes curved surfaces 36 and 38 that engage the cable for different positions of the armrest and provide a smooth transition for the direction of the cable.

Referring to FIG. 4, the index plate 10 provides features that hold the armrest in the upright, locked position and in lowered positions. Thus, the index plate includes a slot 40 that is engaged by a pin 42 (see FIG. 1) for controlling the overall extent of motion of the armrest. A lock hole 44 receives a lock pin 46 when the armrest is in the upright locked position. A detent 48 receives the pin 46 when the armrest is in a lowered position to hold it just above its down position to allow maintenance workers to service the vehicle without obstruction from the armrest. A land 50 receives the pin 46 when the armrest is fully down. A groove 52 extends between the hole 44, detent 48, and land 50. A slot 54 is provided to allow passage of the cable 32 from the hub cavity 30. The slot is elongated to allow the cable to assume a downwardly angled orientation to prevent kinks in the cable. The index plate includes boltholes 56 for securing the mounting mechanism to the seat frame. Also, a groove 58 is provided to receive a wave washer 60 that fits between the frame element 22 and the index plate to provide resilience to the mounting mechanism.

Referring again to FIG. 1, the diameters of the washer 14 and the end plate 16 are larger than the diameter of the hole 24 whereby the end plate and washer are held against the hub plate 20 when the mounting mechanism and armrest are assembled.

Retaining pins 62 pass through the end plate 16, washer 14, hub 12, and into index plate 10 to secure the mounting mechanism to the armrest and provide a single unit for attachment to a seat frame. These pins may be flat head screws, pins as shown, or any element that holds these parts together. During final assembly, bolts passing though holes 28 and 56 and cooperating holes in the other elements secure the armrest and mounting mechanism to the seat frame.

The lock pin 46 is carried in holes 64 in the hub plates 20, 22 for movement toward and away from the index plate. In the preferred embodiment, the pin slides in the holes 64 and is retained by a retaining ring 66 that snaps into a grove 68 in the pin. The pin is urged toward the index plate by a spring plate 70, which includes an opening 72 in the shape of a keyhole that engages a slot 74 on the pin. The end of the spring plate 70 opposite the hole 72 is bolted to the hub plate by bolts 76. Thus, the spring plate urges the lockpin 46 toward the index plate 10 and is pulled away from the index plate by the operator's pulling outward on the spring plate.

Figure 5:
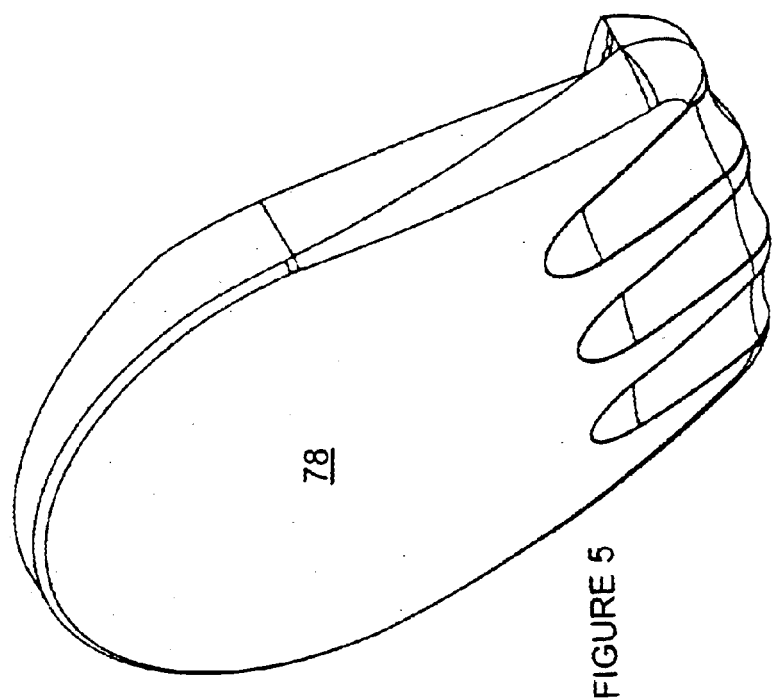
FIG. 5 is a perspective of a preferred handgrip.

The spring plate 70 is covered by a decorative handgrip 78 such as that shown in FIG. 5. The handgrip includes a slot on the interior surface that engages the bottom edge of the spring plate 70. The handgrip also includes prongs that releasably engage axles 80 of a mounting bar 82. The mounting bar is also held to the hub plate 20 by bolts 76. In use, the handgrip 78 pivots about the axles 80 to pull the spring plate 70 and pin 46 away from the index plate in response to the operator's pulling outward on the bottom of the handgrip 78.

The upper end of the cable 32 is received in a finger lever 84, which is conveniently positioned for actuation by the operator's fingers. The finger lever and decorative bezel 86 are secured to the underside of the armrest by a screw 88.

In operation, the lock pin 46 will hold the armrest in an upright position when the lock pin is in lock hole 44, and in a cleaning position when the lock pin is in detent 48. When in the fully lowered position, the lock pin contacts the land 50. Thus, the armrest is held securely in the upright position and only lightly in the cleaning position. It can be raised easily from the lowered position.

The lock pin is released from the lock hole 44 by grasping the handgrip 78 with the fingers and pulling outward on it. This pivots the handgrip and spring plate about the mounting bar 82 lifting the lock pin 46 from the lock hole 44.

Depression of the finger lever 84 pulls on the cable to release the relevant chair mechanism and, for example, allow adjustment of the position of the chair back.

Modifications within the scope of the appended claims will be apparent.

I claim:

1. In combination, an armrest having an opening at one end and a mounting mechanism, wherein said mounting mechanism comprises hub means received in said opening for carrying said armrest in pivotal motion, index plate means for controlling the motion of said armrest, and spring plate means for controlling the operation of a lock pin engaged in said index plate means, wherein said index plate means and said spring plate means are configured to be positioned on opposite sides of said hub means when assembled.

2. A pivoting armrest comprising a first elongate portion configured to receive an arm of a passenger and a second portion, wherein said second portion comprises a hubplate having a hole therein configured to receive a hub and allow pivotal motion of said armrest about said hub, and further comprising a lock pin mounted to said second portion to move with respect to said second portion, and a handgrip pivotally mounted to said second portion and connected to said lock pin for controlling motion of said lock pin and comprising a resilient plate mounted to said second portion and engaging said lock pin and said handgrip, said resilient plate being arranged to urge said lock pin in a first direction and to pull said lock pin in a second direction when a force is applied to the resilient plate by said handgrip.

3. An armrest according to claim 2 wherein said first portion is elongated in a horizontal direction and said second portion is displaced from said first portion in a vertical direction whereby said armrest is configured to be mounted to a lower part of a vehicle seat frame.

4. An arm rest according to claim 3 wherein said second portion has a lower edge and said handgrip has a lower edge adjacent the lower edge of said second portion.

5. An armrest according to claim 4 wherein said hub includes an outer cylindrical surface that engages said hole and includes a cavity configured to receive a control cable.

6. An armrest according to claim 5 wherein said hub further includes curved surfaces providing an entrance for said control cable to said cavity.

7. An armrest according to claim 6 wherein said first portion further comprises a control mechanism for said control cable.

8. An armrest according to claim 4 further comprising an index plate having surfaces therein configured to receive said lock pin.

\* \* \* \* \*